United States Patent
Ito et al.

(10) Patent No.: US 10,854,877 B2
(45) Date of Patent: Dec. 1, 2020

(54) ALL-SOLID-STATE SECONDARY BATTERY

(71) Applicants: Samsung Electronics Co., Ltd., Suwon-si (KR); KARLSRUHE INSTITUTE OF TECHNOLOGY, Karlsruhe (DE)

(72) Inventors: Seitaro Ito, Kanagawa (JP); Ulderico Ulissi, Ulm (DE); Yuichi Aihara, Kanagawa (JP); Alberto Varzi, Ulm (DE); Stefano Passerini, Ulm (DE)

(73) Assignees: SAMSUNG ELECTRONICS CO., LTD., Gyeonggi-Do (KR); KARLSRUHE INSTITUTE OF TECHNOLOGY, Karlsruhe (DE)

( * ) Notice: Subject to any disclaimer, the term of this patent is extended or adjusted under 35 U.S.C. 154(b) by 172 days.

(21) Appl. No.: 16/113,100

(22) Filed: Aug. 27, 2018

(65) Prior Publication Data

US 2019/0067695 A1    Feb. 28, 2019

(30) Foreign Application Priority Data

Aug. 25, 2017 (JP) ................... 2017-162124
Jul. 2, 2018 (KR) ................ 10-2018-0076701

(51) Int. Cl.
*H01M 4/58* (2010.01)
*H01M 4/136* (2010.01)
(Continued)

(52) U.S. Cl.
CPC ......... *H01M 4/5815* (2013.01); *H01M 4/136* (2013.01); *H01M 4/364* (2013.01);
(Continued)

(58) Field of Classification Search
CPC .... H01M 4/136; H01M 4/366; H01M 4/5815; H01M 4/364; H01M 10/052; H01M 10/0525
See application file for complete search history.

(56) References Cited

U.S. PATENT DOCUMENTS 9,172,113 B2 * 10/2015 Ohtomo ............ H01M 10/0562
9,680,179 B2 *  6/2017 Tsuchida ............... H01M 4/131
(Continued)

FOREIGN PATENT DOCUMENTS

JP    2009301959 A    12/2009
JP    2015503837 A     2/2015
(Continued)

OTHER PUBLICATIONS

M. Y. Pan et al., "Preparation and evaluation of FeSx-Li3PS4-VGCF composite positive electrodes and their application to all-solid-state lithium batteries", 21 Solid State Ionics (SSI-21), Poster Presentation dated Jun. 18-23, 2017, Reference on pp. 513, Padova, Italy.
(Continued)

*Primary Examiner* — Amanda C. Walke
(74) *Attorney, Agent, or Firm* — Cantor Colburn LLP

(57) ABSTRACT

An all-solid-state secondary battery including: a positive electrode layer; a negative electrode layer; and a solid electrolyte layer between the positive electrode layer and the negative electrode layer, wherein the positive electrode layer includes a sulfur-containing positive electrode active material, a halogen-containing sulfide solid electrolyte, and a conductive carbon material, and wherein the sulfur-containing positive electrode active material includes elemental sulfur and a transition metal disulfide.

20 Claims, 1 Drawing Sheet

(51) Int. Cl.
*H01M 10/0525* (2010.01)
*H01M 4/38* (2006.01)
*H01M 4/36* (2006.01)
*H01M 10/052* (2010.01)
*H01M 4/62* (2006.01)
*H01M 10/0562* (2010.01)
*H01M 4/02* (2006.01)

(52) U.S. Cl.
CPC ............ *H01M 4/366* (2013.01); *H01M 4/38* (2013.01); *H01M 4/624* (2013.01); *H01M 4/625* (2013.01); *H01M 10/052* (2013.01); *H01M 10/0525* (2013.01); *H01M 10/0562* (2013.01); *H01M 2004/028* (2013.01); *H01M 2300/0068* (2013.01); *H01M 2300/0091* (2013.01)

(56) References Cited

U.S. PATENT DOCUMENTS

| | | | |
|---|---|---|---|
| 9,745,578 B2 | 8/2017 | Chung et al. | |
| 9,761,906 B2* | 9/2017 | Yanagi | H01M 10/0525 |
| 10,177,381 B2* | 1/2019 | Fanous | H01M 4/364 |
| 2014/0255787 A1* | 9/2014 | Passerini | H01M 4/1393 |
| | | | 429/231.8 |
| 2014/0377664 A1* | 12/2014 | Yersak | H01M 4/5815 |
| | | | 429/305 |
| 2015/0214574 A1* | 7/2015 | Tanaka | H01M 10/0562 |
| | | | 429/323 |
| 2016/0248082 A1 | 8/2016 | Yersak et al. | |
| 2017/0040636 A1 | 2/2017 | Oki et al. | |
| 2017/0256786 A1 | 9/2017 | Ito et al. | |
| 2017/0331148 A1 | 11/2017 | Yersak et al. | |
| 2018/0166740 A1* | 6/2018 | Iwasaki | C03C 10/00 |
| 2019/0229380 A1* | 7/2019 | Son | H01M 4/386 |

FOREIGN PATENT DOCUMENTS

| | | |
|---|---|---|
| JP | 2015504847 A | 2/2015 |
| JP | 2017033859 A | 2/2017 |
| JP | 2017157473 A | 9/2017 |

OTHER PUBLICATIONS

R. Omoda et al., "Li—S secondary battery using CNT as high sulfur loading cathode", 18th International Meeting on Lithium Batteries, Poster Presentation dated Jun. 19-24, 2016, Reference on p. 528.

Seitaro Ito et al., All solid-state lithium-sulfur battery with high ion-conducting LiI-Li3PS4 glass solid electrolyte, 68th Annual meeting of ISE, Poster Presentation, Published Aug. 25, 2016.

Takashi Hakari et al., "All-solid-state lithium batteries with Li3PS4 glass as active material", J. Power Sources, Available online: Jun. 9, 2015, pp. 721-725, vol. 293.

Yuichi Aihara et al., "The electrochemical characteristics and applicability of an amorphous sulfide-based solid ion conductor for the next-generation solid-state lithium secondary batteries" Frontiers in Energy Research, published on May 13, 2016, vol. 4, Article 18.

\* cited by examiner

ALL-SOLID-STATE SECONDARY BATTERY

CROSS-REFERENCE TO RELATED APPLICATIONS

This application claims priority to and the benefit of Japanese Patent Application No. 2017-162124, filed on Aug. 25, 2017, in the Japanese Patent Office, and Korean Patent Application No. 10-2018-0076701, filed on Jul. 2, 2018, in the Korean Intellectual Property Office, the contents of which are incorporated herein in their entireties by reference.

BACKGROUND

1. Field

The present disclosure relates to an all-solid-state secondary battery.

2. Description of the Related Art

A lithium-sulfur secondary battery (Li—S secondary battery) using a sulfur compound as a positive electrode active material is a battery system that is expected to be a next-generation battery candidate because sulfur has a large theoretical specific capacity (1650 mAh/g).

However, when using an electrolyte solution in a lithium-sulfur battery, polysulfide ($Li_xS_y$), which is an intermediate of an active material generated during a charge-discharge process, dissolves in to the electrolyte solution. The dissolution of polysulfide results in rapid capacity loss and poor cycle characteristics.

In contrast, in an all-solid-state Li—S secondary battery, in which all materials constituting the battery are solid, there is essentially no dissolution of the polysulfide. Nonetheless, there remains a need for an improved lithium-sulfur battery material, and a battery comprising the same

SUMMARY

In an all-solid-state Li—S secondary battery, levels of electron conductivity and ion conductivity are less than in Li—S secondary batteries using a liquid electrolyte solution. Because of the relatively low electron conductivity and ion conductivity, all-solid-state Li—S secondary batteries are problematic in that the amount of sulfur loaded per unit area cannot be increased.

For example, it is reported that Li—S secondary batteries using an electrolyte solution operate at a sulfur loading of up to 20 milligrams per centimeter squared ($mg/cm^2$). In contrast, an all-solid-state Li—S secondary batteries have a sulfur loading of 1 $mg/cm^2$, and specific capacity is rapidly deteriorated at a sulfur loading of 4 $mg/cm^2$ or 5 $mg/cm^2$.

The present disclosure provides an all-solid-state secondary battery which has large specific capacity even when a relatively large amount of a positive electrode active material is loaded.

Additional aspects will be set forth in part in the description which follows and, in part, will be apparent from the description, or may be learned by practice of the presented embodiments.

According to an embodiment, an all-solid-state secondary battery includes: a positive electrode layer; a negative electrode layer; and a solid electrolyte layer between the positive electrode layer and the negative electrode layer, wherein the positive electrode layer includes a sulfur-containing positive electrode active material, a halogen-containing sulfide solid electrolyte, and a conductive carbon material, and wherein the sulfur-containing positive electrode active material includes elemental sulfur and a transition metal disulfide.

In this regard, it is possible to provide an all-solid-state secondary battery which has an improved specific capacity even when a relatively large amount of a positive electrode active material is loaded. Further, it is possible to improve the specific capacity of the all-solid-state secondary battery while improving the ion conductivity of the positive electrode layer.

The transition metal disulfide may include iron disulfide.

In this regard, it is possible to further increase the specific capacity of the all-solid-state secondary battery.

The elemental sulfur and the transition metal disulfide may have a weight ratio of the transition metal disulfide to the elemental sulfur is greater than 0 and less than 8.

In this regard, it is possible to further increase the specific capacity of the all-solid-state secondary battery.

For example, the weight ratio A of the transition metal disulfide to the elemental sulfur may satisfy $0.5 \leq A \leq 2$.

The content of the sulfur-containing positive electrode active material in the positive electrode layer may be about 0.5 $mg/cm^2$ or more. For example, the content of the sulfur-containing positive electrode active material in the positive electrode layer may be about 1 $mg/cm^2$ or more.

In this regard, it is possible to increase the specific capacity of the all-solid-state secondary battery even when a large amount of an active material is loaded.

The content of the sulfur-containing positive electrode active material in the positive electrode layer may be about 10 $mg/cm^2$ or less.

In this regard, it is possible to increase the specific capacity of the all-solid-state secondary battery even when a relatively large amount of the positive electrode active material is loaded.

The content of the sulfur-containing positive electrode active material in the positive electrode layer may be about 5 weight percent (wt %) to about 70 wt %, based on a total weight of the positive electrode layer.

The surface area of the conductive carbon material may be about 1000 square meters per gram ($m^2/g$) or more.

In this regard, it is possible to improve the electron conductivity of the positive electrode layer.

The surface area of the conductive carbon material may be about 6000 $m^2/g$ or less.

In this regard, it is possible to increase the specific capacity of the all-solid-state secondary battery even when a relatively large amount of the positive electrode active material is loaded.

The conductive carbon material may include active carbon.

In this regard, it is possible to improve the electron conductivity of the positive electrode layer.

The halogen-containing sulfide solid electrolyte may include a halide, and the halide may be represented by LiX, wherein, X is Cl, Br, or I.

In this regard, it is possible to improve the specific capacity of the all-solid-state secondary battery while improving the ion conductivity of the positive electrode layer.

The composition of the halogen-containing sulfide solid electrolyte may be of the formula $aLiX-(100-a)(0.75Li_2S-0.25P_2S_5)$, wherein, $0<a<50$ and X is Cl, Br, or I.

The composition of the halogen-containing sulfide solid electrolyte may be $35LiI \cdot 65(0.75Li_2S \cdot 0.25P_2S_5)$.

The positive electrode layer may further include a sulfide solid electrolyte other than the halogen-containing sulfide solid electrolyte.

In this regard, it is possible to improve the ion conductivity of the positive electrode layer.

The sulfide solid electrolyte may include $Li_2S$—$P_2S_5$, $Li_2S$—$P_2S_5$—LiX wherein X is a halogen element, $Li_2S$—$P_2S_5$—$Li_2O$, $Li_2S$—$SiS_2$, $Li_2S$—$SiS_2$—$B_2S_3$, $Li_2S$—$B_2S_3$, $Li_2S$—$P_2S_5$—$Z_mS_n$ wherein m and n are each independently a positive integer, and Z is at least one of Ge, Zn, and Ga, $Li_2S$—$GeS_2$, $Li_2S$—$SiS_2$—$Li_3PO_4$, and $Li_2S$—$SiS_2$-$Li_p$-$MO_q$ wherein p and q are each independently a positive integer, and M is at least one of P, Si, Ge, B, Al, Ga, and In.

The sulfide solid electrolyte may include $Li_3PS_4$.

In this regard, it is possible to improve the specific capacity of the all-solid-state secondary battery while improving the ion conductivity of the positive electrode layer.

The sulfide solid electrolyte may include $Li_2S$—$P_2S_5$. For example, the molar ratio of $Li_2S$ to $P_2S_5$ in the $Li_2S$—$P_2S_5$ may be 50:50 to 90:10. For example, the composition of the sulfide solid electrolyte may be $0.75Li_2S$-$0.25P_2S_5$.

The negative electrode layer may be a lithium metal layer.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
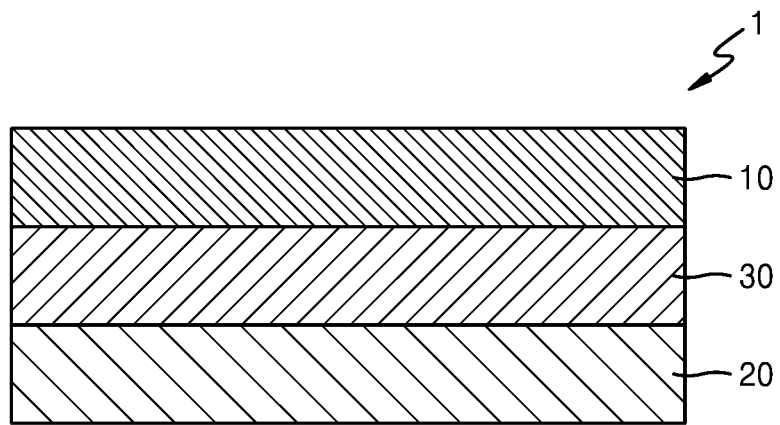
FIG. 1 is a cross-sectional view schematically illustrating a layer structure of an embodiment of an all-solid-state secondary battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, an embodiment will be described in detail by explaining exemplary embodiments with reference to the accompanying drawings. In addition, like reference numerals in the present specification and drawings denote like elements.

1. Configuration of the All-Solid-State Secondary Battery

Hereinafter, a configuration of an all-solid-state secondary battery 1 according to an embodiment of the present disclosure will be described with reference to FIG. 1. FIG. 1 is a cross-sectional view schematically illustrating a layer structure of an all-solid-state secondary battery according to an embodiment of the present disclosure.

As shown in FIG. 1, an all-solid-state secondary battery 1 has a structure in which a positive electrode layer 10, a negative electrode layer 20, and a solid electrolyte layer 30 between the positive electrode layer 10 and the negative electrode layer 20 are laminated.

Positive Electrode Layer

The positive electrode layer 10 includes a positive electrode active material including a sulfur-containing positive electrode active material and a conductive material including a conductive carbon material. Further, in an embodiment, the positive electrode layer 10 further includes a solid electrolyte.

Positive Electrode Active Material

As described above, the positive electrode layer 10 includes a sulfur-containing positive electrode active material as a positive electrode active material. Here, the sulfur-containing the positive electrode active material includes elemental sulfur and a metal disulfide. Therefore, in the all-solid-state secondary battery 1 according to an embodiment of the present disclosure, it is possible to increase a specific capacity even when a relatively large amount of a positive electrode active material is loaded.

In an embodiment, a sulfur-containing compound as an active material, including elemental sulfur, is an insulator, or does not have sufficient ion conductivity or electron conductivity for use in a battery. However, in an embodiment of the present disclosure, sufficient ion conductivity and electron conductivity is provided by the transition metal component in the transition metal disulfide. Therefore, the transition metal disulfide has a smaller theoretical capacity per se as compared with elemental sulfur, but as a result, the specific capacity of the all-solid-state secondary battery 1 can be improved.

In an embodiment, the elemental sulfur, which has a large specific capacity, contributes to the improvement of the overall specific capacity of the all-solid-state secondary battery 1, and contributes to the maintenance of the crystal structure of the transition metal disulfide during charge and discharge. Specifically, when a conductive material, such as a conductive carbon material, is added to the positive electrode layer without using the elemental sulfur, while not wanting to be bound by theory, is understood that the conductive material adsorbs sulfur from the transition metal disulfide, resulting in the collapse of the crystal structure of the transition metal disulfide. The collapsed transition metal disulfide is converted into a transition metal monosulfide. In this case, sufficient ion conductivity and electron conductivity may not be provided in the positive electrode layer. However, in an embodiment of the present disclosure, the positive electrode layer 10 includes elemental sulfur together with the transition metal disulfide, so that the elemental sulfur is preferentially adsorbed in the conductive material, and thus the crystal structure of the transition metal disulfide is maintained. As a result, the ionic conductivity and electron conductivity of the positive electrode layer 10 can be enhanced.

As described above, the all-solid-state secondary battery 1 includes the positive electrode layer 10 including both elemental sulfur and a transition metal disulfide, resulting in a large specific capacity.

Here, the transition metal element included in the transition metal disulfide is not particularly limited, but examples thereof may include first transition metals (Sc, Ti, V, Cr, Mn, Fe, Co, Ni, Cu, and Zn), second transition metals (Y, Zr, Nb, Mo, Tc, Ru, Rh, Pd, Ag, and Cd), and third transition metals (La, Ce, Pr, Nd, Pm, Sm, Eu, Gd, Tb, Dy, Ho, Er, Tm, Yb, Lu, Hf, Ta, W, Re, Os, Ir, Pt, Au, and Hg). A combination comprising at least one of the foregoing may be used. Among the above-described transition metals, the transition metal element included in the transition metal disulfide may be Fe, Ti, Mo, or a combination thereof. Use of Fe is mentioned.

Specifically, the transition metal disulfide may be, for example, iron disulfide ($FeS_2$). This iron disulfide ($FeS_2$) can be preferable in that it exhibits a reversible oxidation-reduction reaction.

Further, the weight ratio of the transition metal disulfide to elemental sulfur in the positive electrode layer 10 (content (wt %) of at least one transition metal disulfide/content (wt %) of elemental sulfur) may be greater than 0 and less than 0.

The weight ratio of the transition metal disulfide to elemental sulfur in the positive electrode layer may satisfy be greater than or equal to 0.2 to less than or equal to 3, for example, greater than or equal to 0.5 to less than or equal to 2.

When the weight ratio of the transition metal disulfide to elemental sulfur is 0.5 or more, the ion conductivity and electron conductivity of the positive electrode layer 10 are further increased, and when the weight ratio of the transition metal disulfide to elemental sulfur is 2 or less, it is easier to maintain the crystal structure of the transition metal disulfide.

The positive electrode layer 10 includes a sulfur-containing positive electrode active material in an amount of about 0.5 $mg/cm^2$ or more, for example, about 1 $mg/cm^2$ or more, and for example, about 2 $mg/cm^2$ or more per unit area, e.g., about 0.05 $mg/cm^2$ to about 20 $mg/cm^2$. In an embodiment of the present disclosure, even when the positive electrode layer 10 includes a relatively large amount of a sulfur-containing positive electrode active material, for example, an amount of more than 2 $mg/cm^2$, the ion conductivity and electron conductivity of the positive electrode layer 10 are sufficiently high, so that the decrease of the specific capacity is suppressed. The upper limit of the content of the sulfur-containing positive electrode active material in the positive electrode layer 10 per unit area is not particularly limited, but may be substantially, for example, 10.0 $mg/cm^2$ or less.

Further, the content of the sulfur-containing positive electrode active material in the positive electrode layer 10 is about 5 wt % to about 70 wt %, for example, about 10 wt % to about 50 wt %, based on the total weight of the positive electrode layer 10.

The positive electrode layer 10 may include a positive electrode active material other than the sulfur-containing positive electrode active material within the range not hindering the effect of the present disclosure. Such a positive electrode active material is not particularly limited, but, for example, suitable positive electrode active materials having a charging-discharging potential range overlapping with or approximate to that of the sulfur-containing positive electrode active material may be used.

Solid Electrolyte

The positive electrode layer 10 generally includes a solid electrolyte. The solid electrolyte is not particularly limited, but may be a sulfide solid electrolyte.

The sulfide solid electrolyte is not particularly limited, but examples thereof may include $Li_2S$—$P_2S_5$, $Li_2S$—$P_2S_5$—LiX (wherein X is a halogen element), $Li_2S$—$P_2S_5$—$Li_2O$, $Li_2S$—$SiS_2$, $Li_2S$—$SiS_2$—$B_2S_3$, $Li_2S$—$B_2S_3$, $Li_2S$—$P_2S_5$—$Z_mS_n$ (wherein m, n is a positive integer, and Z is Ge, Zn, Ga, or a combination thereof), $Li_2S$—$GeS_2$, $Li_2S$—$SiS_2$—$Li_3PO_4$, and $Li_2S$—$SiS_2$-$Li_pMO_q$ (wherein p, q is a positive integer, and M is P, Si, Ge, B, Al, Ga, In, or a combination thereof). These sulfide solid electrolytes may be used alone or as a combination of two or more thereof.

The solid electrolyte of the positive electrode layer 10 may include a sulfide solid electrolyte having a $Li_3PS_4$ structure. The sulfide solid electrolyte having a $Li_3PS_4$ structure may have improved ion conductivity (for example, $10^{-4}$ S/cm or more at 25° C.), and may suitably transport Li ions to the positive electrode active material. When a charging-discharging potential is applied to such a sulfide solid electrolyte, this sulfide solid electrolyte exhibits a redox capacity in the positive electrode layer 10 in the presence of a conductive carbon material, so that this sulfide solid electrolyte functions as a positive electrode active material and acts as a positive electrode electrolyte (catholyte) exhibiting Li ion conductivity.

The halogen-containing sulfide solid electrolyte has greater ion conductivity (for example, $10^{-3}$ S/cm or more at 25° C.) as compared with a case where no halogen is added, and may transport Li ions to the positive electrode active material. The halogen-containing sulfide solid electrolyte can also exhibit an improved effect as a positive electrode electrolyte. Specifically, the halide may be lithium halide (LiX), sodium halide (NaX), alkyl halide, or the like. Here, the X may be, for example, chlorine (Cl), bromine (Br), or iodine (I).

The sulfide solid electrolyte material constituting the halogen-containing sulfide solid electrolyte may be selected from among the aforementioned sulfide solid electrolytes. Among the aforementioned sulfide solid electrolytes, a sulfide solid electrolyte including sulfur (S), phosphorus (P), lithium (Li), or a combination thereof, as a constituent element is preferable, a sulfide solid electrolyte including all of sulfur (S), phosphorus (P), and lithium (Li) is more preferable, and a sulfide solid electrolyte including $Li_2S$—$P_2S_5$ is more preferable. Further, the halogen-containing sulfide solid electrolyte may include any of a crystalline material, an amorphous material, and a glass material, and any material suitable for battery characteristics.

When a material containing $Li_2S$—$P_2S_5$ is used as a sulfide solid electrolyte material forming the halogen-containing sulfide solid electrolyte, the molar ratio of $Li_2S$ to $P_2S_5$ may be selected from the range of, for example, 50:50 to 90:10. Specifically, the halogen-containing sulfide solid electrolyte may include, but is not limited to, amorphous $0.75Li_2S \cdot 0.25P_2S_5$ as a sulfide solid electrolyte material. Specifically, the added halide in the halogen-containing sulfide solid electrolyte may be, but is not limited to, LiX (wherein X is Cl, Br, I, or a combination thereof). When such halide conditions are satisfied, it is possible to improve the charging-discharging capacity of the all-solid-state secondary battery 1 and to improve the conductivity of Li ions in the positive electrode layer 10.

Specifically, the composition of the halogen-containing sulfide solid electrolyte may be represented by $aLiX \cdot (100-a)(0.75Li_2S \cdot 0.25P_2S_5)$ wherein, $0<a<50$ and X is Cl, Br, or I, or a combination thereof), but is not limited thereto. More specifically, the added halide may be LiI, but is not limited thereto.

More specifically, the composition of the halogen-containing sulfide solid electrolyte may be represented by $35LiI \cdot 65(0.75Li_2S \cdot 0.25P_2S_5)$, but is not limited thereto. When the composition of the halogen-containing sulfide solid electrolyte is as described above, it is possible to improve the charging-discharging capacity of the all-solid-state secondary battery 1 and to improve the conductivity of ions in the positive electrode layer 10.

Examples of the shape of the sulfide solid electrolyte may include particle shapes such as a spherical shape and an elliptical shape. The particle diameter (for example, average particle diameter) of the sulfide solid electrolyte is not particularly limited, and may be about 0.01 micrometer (μm) to about 30 μm, for example, about 0.1 μm to about 20 μm. Here, the "average particle diameter" refers to a number average diameter of a particle size distribution obtained by scattering or the like, and may be measured by a particle size distribution meter or the like.

The content of the sulfide solid electrolyte in the positive electrode layer 10 may be about 10 wt % to about 80 wt %, for example, about 20 wt % to about 70 wt %, based on the total weight of the positive electrode layer 10.

Conductive Material

As is further described above, the positive electrode layer 10 includes a conductive material. The positive electrode layer 10 includes a conductive carbon material as the conductive material.

The conductive carbon material can provide improved electron conductivity, but can also to adsorb elemental sulfur, which is an active material, and easily changes the crystal structure of transition metal disulfide. However, in the present embodiment, the positive electrode layer 10 includes elemental sulfur together with transition metal disulfide, so that the elemental sulfur is preferentially adsorbed in the conductive carbon material, and thus the crystal structure of the transition metal disulfide can be maintained.

The conductive carbon material is not particularly limited, examples thereof may include active carbon, graphite, carbon black, acetylene black, ketjen black, and carbon fiber. These conductive carbon materials may be used alone or as a combination thereof. Among the aforementioned conductive carbon materials, active carbon is preferable, but the present disclosure is not limited thereto. The active carbon can provide improved electron conductivity because it has a large specific surface area. Since the active carbon has a large specific surface area, the active carbon may absorb a sulfur element. However, the problem of a change in the crystal structure of the transition metal disulfide due to adsorptivity of such active carbon is solved by the aforementioned elemental sulfur.

The specific surface area of the conductive carbon material is not particularly limited, but may be about 600 $m^2/g$ or more, for example, about 800 $m^2/g$ to about 6,000 $m^2/g$, for example, about 1,000 $m^2/g$ to about 4,000 $m^2/g$. In this case, the electron conductivity of the positive electrode layer 10 can be improved. As described above, such a large specific surface area can be easily obtained by using active carbon as the conductive carbon material.

The content of the conductive carbon material in the positive electrode 10 may be, for example, about 1 wt % to about 50 wt %, for example, about 5 wt % to about 30 wt %, but is not limited thereto.

The positive electrode layer 10 may further include a conductive auxiliary material in addition to the conductive carbon material. Such a conductive auxiliary material is not particularly limited, but may be metal powder, a conductive polymer, or the like, which is stable with the sulfide solid electrolyte.

Other Components

In the positive electrode layer 10, in addition to the positive electrode active material, the solid electrolyte, and the conductive auxiliary material, additives such as a coating agent, a binder, a filler, a dispersant, and an ion conductive material may be appropriately combined.

Examples of the binder applicable to the positive electrode layer 10 may include polytetrafluoroethylene, polyvinylidene fluoride, and polyethylene. Further, as the coating agent, dispersant, ion conductive material, and the like applicable to the positive electrode layer 10, other suitable materials used for electrodes of lithium ion batteries may be used.

Negative Electrode Layer

The negative electrode layer 20 is a layer including a negative electrode active material.

The negative electrode layer 20 may be, for example, a lithium metal layer. In this case, the lithium metal in the lithium metal layer acts as a negative electrode active material, and a large amount of lithium ions may be supplied in the system of the all-solid-state secondary battery 1. Further, since the lithium metal layer is a good conductor, a negative electrode current collector to be described later may be omitted.

The negative electrode layer 20 may be, for example, a layer including a negative electrode active material, a solid electrolyte, and a negative electrode layer conductive material.

The negative electrode active material may have a low charging-discharging potential as compared with the positive electrode active material included in the positive electrode layer 10, and may be an active material capable of alloying with lithium or reversibly occluding and releasing lithium.

For example, as the negative electrode active material, a metal active material, a carbon-based active material, or the like may be used. Examples of the metal active material may include metals such as lithium (Li), indium (In), aluminum (Al), tin (Sn), and silicon (Si), an alloy thereof, or a combination thereof. Examples of the carbon-based active material may include artificial graphite, graphite carbon fiber, resin-fired carbon, pyrolysis-grown carbon, cokes, mesocarbon microbeads (MCMB), furfuryl alcohol resin-fired carbon, polyacene, pitch-based carbon filber, vapor-grown carbon fiber, natural graphite, and non-graphitizable carbon. These negative electrode active materials may be used alone or as a combination thereof. Since the aforementioned positive electrode active material has a low lithium content, the negative electrode active material may contain lithium in advance, or may be pre-doped with lithium.

The content of the negative electrode active material in the negative electrode 20 may be about 20 wt % to about 95 wt %, for example, about 50 wt % to about 90 wt %, based on the total weight of the negative electrode layer 20, but is not limited thereto.

As the negative electrode conductive layer, a conductive material the same as the aforementioned positive electrode conductive material may be used. As the solid electrolyte, a compound the same as the solid electrolyte included in the aforementioned positive electrode layer 10 may be used. Therefore, a further description of such a configuration will be omitted here.

The content of the negative electrode conductive material in the negative electrode layer 20 may be about 1 wt % to about 50 wt %, for example, about 5 wt % to about 20 wt %, based on the total weight of the negative electrode layer 20, but is not limited thereto.

The content of the solid electrolyte in the negative electrode layer 20 may be about 10 wt % to about 95 wt %, for example, about 20 wt % to about 90 wt %, based on the total weight of the negative electrode layer 20, but is not limited thereto.

In the negative electrode layer 20, in addition to the aforementioned negative electrode active material, solid electrolyte, and negative electrode layer conductive material, additives such as a binder, a filler, a dispersant, and an ion conductive material may be appropriately combined.

As the additives used for the negative electrode layer 20, additives the same as the additives used for the positive electrode layer 10 may be used.

Solid Electrolyte Layer

The solid electrolyte layer 30 may include a solid electrolyte disposed between the positive electrode layer 10 and the negative electrode layer 20. As the solid electrolyte, a compound the same as the solid electrolyte included in the positive electrode layer 10 may be used. Therefore, a description of the above configuration in the present specification will be omitted.

Heretofore, the configuration of the all-solid-state secondary battery 1 according to the present embodiment has been described in detail. Further, the all-solid-state secondary battery 1 generally includes a current collector (not shown) disposed to be in contact with the positive electrode layer 10 and the negative electrode layer 20.

The current collector used in the positive electrode layer 10 and the negative electrode layer 20 may be, for example, a plate or foil formed of indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof.

When the negative electrode layer 20 is a lithium metal layer, the lithium metal layer may be used as a current collector of the negative electrode layer 20 depending on the structure of the lithium metal layer. That is, it is possible to omit the disposition of a separate negative electrode current collector.

Method of Manufacturing All-Solid-State Secondary Battery

Next, a method of manufacturing an all-solid-state secondary battery 1 according to the present embodiment will be described. The all-solid-state secondary battery 1 according to the present embodiment may be manufactured by respectively fabricating the positive electrode layer 10, the negative electrode layer 20, and the solid electrolyte layer 30, and then laminating these layers.

Fabrication of Solid Electrolyte Layer

The solid electrolyte layer 30 may be fabricated by a halogen-containing sulfide solid electrolyte in which a halide is added to a sulfide solid electrolyte.

First, a halogen-containing sulfide solid electrolyte is prepared by using a melt quenching method or a mechanical milling method.

For example, when the melt quenching method is used, halogen and $Li_2S$ and $P_2S_5$ are mixed in a predetermined amount and formed into pellets, the pellets are reacted at predetermined reaction temperature in a vacuum state, and then the reaction product is quenched to prepare a halogen-containing sulfide solid electrolyte. The reaction temperature of the mixture of halogen and $Li_2S$ and $P_2S$ may be about 400° C. to about 1000° C., for example, about 800° C. to about 900° C., but is not limited thereto. Further, the reaction time may be about 0.1 hours to about 12 hours, for example, about 1 hour to 12 hours, but is not limited thereto. Further, the quenching temperature of the reactants may be about 10° C. or less, for example, about 0° C. or less, but is not limited thereto. The quenching rate may be about 1° C./sec to about 10000° C./sec, for example, about 1° C./sec to about 1000° C./sec.

Further, when the mechanical milling method is used, halogen and $Li_2S$ and $P_2S_5$ are mixed in a predetermined amount, stirred using a ball mill or the like, and reacted to prepare a halogen-containing sulfide solid electrolyte. Further, in the mechanical milling method, stirring speed and stirring time are not particularly limited, but the production rate of halogen-containing sulfide solid electrolyte may increase as the stirring speed increases. Further, the conversion rate of the raw material of the halogen-containing sulfide solid electrolyte may increase as the stirring time increases.

Thereafter, the halogen-containing sulfide solid electrolyte obtained by the melt quenching method or the mechanical milling method is heat-treated at predetermined temperature and then pulverized to prepare a particulate halogen-containing sulfide solid electrolyte.

Subsequently, the halogen-containing sulfide solid electrolyte obtained by the above method is deposited by using a film forming method such as blasting, aerosol deposition, cold spray, sputtering, chemical vapor deposition (CVD), or spraying, to fabricate a solid electrolyte layer 30. Further, the solid electrolyte layer 30 may be fabricated by pressing the halogen-containing sulfide solid electrolyte. Further, the solid electrolyte layer 30 may be formed by mixing a halogen-containing sulfide solid electrolyte and a solvent with a binder or a support and then applying and pressing the mixture. Here, the binder or the support may be added for the purpose of reinforcing the strength of the solid electrolyte layer 30 and preventing the short-circuiting of the halogen-containing sulfide solid electrolyte.

Fabrication of Positive Electrode Layer

The positive electrode layer 10 may be fabricated by the following method. First, a positive electrode active material, the above-prepared solid electrolyte (halogen-containing sulfide solid electrolyte), a conductive material, and various additives are mixed, and added to a solvent such as water or an organic solvent to obtain slurry or paste. Subsequently, the obtained slurry or paste is applied onto a current collector, dried, and then roll-pressed to obtain a positive electrode layer 10. Further, the positive electrode layer 10 may also be fabricated by pressing and rotating the mixture of a solid electrolyte, a positive electrode active material, and a conductive material.

Fabrication of Negative Electrode Layer

The negative electrode layer 20 may be fabricated by the same method as the fabrication of the positive electrode layer 10. Specifically, first, a negative electrode active material, a halogen-containing sulfide solid electrolyte, a negative electrode conductive material, and various additives are mixed, and added to a solvent such as water or an organic solvent to obtain slurry or paste. Subsequently, the obtained slurry or paste is applied onto a current collector, dried, and then roll-pressed to obtain a negative electrode layer 20. Meanwhile, a metal foil forming an alloy with a metal Li or Li ions may be used as the negative electrode layer 20.

Manufacture of All-Solid-State Secondary Battery

The solid electrolyte layer 30, the positive electrode layer 10, and the negative electrode layer 20, which were fabricated by the above methods, are laminated to manufacture an all-solid-state secondary battery 1 according to the present embodiment. Specifically, the positive electrode layer 10 and the negative electrode layer 20 are laminated so as to sandwich the solid electrolyte layer 30, and are pressed to manufacture the all-solid-state secondary battery 1 according to the present embodiment.

Hereinafter, the present disclosure will be described in more detail with reference to the following examples. However, these embodiments are set forth to illustrate the present disclosure, and the scope of the present disclosure is not limited thereto.

EXAMPLES

1. Manufacture of All-Solid-State Secondary Battery

Example 1

First, $LiI$—$Li_3PS_4$ was synthesized as a halogen-containing sulfide solid electrolyte. Specifically, 0.64 g of $Li_2S$, 1.03 g of $P_2S_5$ and 1.33 g of LiI were weighed so as to have a composition ratio of 35 LiI-65 (0.75 $Li_2S$-0.25$P_2S_5$), and they were mixed in a bowl. 1.5 g of the mixed powder was put into a 45 milliliter (mL) $ZrO_2$ pot in an argon (Ar) atmosphere together with $ZrO_2$ balls ($\varphi$10 mm$\times\varphi$7.5 mm$\times$20), and the pot was sealed. The sealed pot was repeatedly rotated at a rotation speed of 380 revolutions per minute (rpm) for 10 minutes at a time interval of 5 minutes until each component could not be detected by X-ray diffraction, and the resultant mixture was reacted by mechanical milling to synthesize $LiI$-$Li_3PS_4$ as a halogen-containing sulfide solid electrolyte.

Subsequently, elemental sulfur, iron disulfide, and active carbon (specific surface area 3000 m$^2$/g) were mixed in a bowl at a weight ratio of 15:15:20. 500 mg of the obtained mixture was put into a 45 ml $ZrO_2$ pot in an argon (Ar) atmosphere together with $ZrO_2$ balls ($\varphi$10 mm$\times$20, $\varphi$7.5 mm$\times$20), and the pot was sealed. The sealed pot was repeatedly rotated 17 times at a rotation speed of 380 rpm for 45 minutes at a time interval of 15 minutes. The obtained mixture and the halogen-containing sulfide solid electrolyte were weighed so as to be equal in weight, and mixed in a bowl. 500 mg of the resultant mixture was put into a 45 ml $ZrO_2$ pot in an argon (Ar) atmosphere together with $ZrO_2$ balls ($\varphi$10 mm$\times$20, $\varphi$7.5 mm$\times$20), and the pot was sealed. The sealed pot was repeatedly rotated 17 times at a rotation speed of 380 rpm for 45 minutes at a time interval of 15 minutes to obtain a positive electrode mixture. The weight ratio of components of the positive electrode mixture was elemental sulfur:Iron disulfide:active carbon:halogen-containing sulfide solid electrolyte=15:15:20:50.

Subsequently, a Li metal foil was provided as a negative electrode layer. The Li metal foil as a negative electrode layer, the halogen-containing sulfide solid electrolyte layer as an electrolyte layer, and the positive electrode mixture were laminated in a Teflon container of $\varphi$13 mm in this order and pressed in the axial direction at a pressure of 4 tons per square centimeter (t/cm$^2$) to form pellets, and a test cell according to Example 1 was manufactured using the pellets. In this case, the positive electrode mixture was laminated such that the weight of the positive electrode active material per unit area was 1 mg/cm$^2$, 4 mg/cm$^2$, or 5 mg/cm$^2$. That is, three types of test cells (all-solid-state secondary batteries) were manufactured such that the content of the positive electrode active material is as above.

Comparative Example 1

A test cell (all-solid-state secondary battery) according to Comparative Example 1 was manufactured in the same manner as in Example 1, except that the positive electrode mixture did not include iron disulfide, and the amount of components was adjusted such that the weight ratio of the respective components of the positive electrode mixture became elemental sulfur:active carbon:halogen-containing sulfide solid electrolyte=30:20:50.

Comparative Example 2

A test cell (all-solid-state secondary battery) according to Comparative Example 2 was manufactured in the same manner as in Example 1, except that the positive electrode mixture did not include elemental sulfur, and the amount of components was adjusted such that the weight ratio of the respective components of the positive electrode mixture became iron disulfide:active carbon:halogen-containing sulfide solid electrolyte=30:20:50.

2. Electrical Evaluation

First, the test cell according to Example 1 and the test cell according to Comparative Example 1 were subjected to the following electrochemical evaluation. Specifically, the charging and discharging characteristics of each of the test cells were evaluated at 25° C. under an argon atmosphere while applying pressure at a torque of 3 Nm. In this case, an electric current of 0.1 C was applied to a positive electrode active material of 1 mg/cm² at a cut-off potential of 1.3V-3.1V (vs. Li/Li+). Further, the charge-discharge capacity (specific capacity) of the charge-discharge curve of a second cycle was measured. The obtained specific capacities are given in Table 1 below. The theoretical specific capacity of the test cell according to Example 1 is 1265 mAh/g, and the theoretical specific capacity of the test cell according to Comparative Example 1 is 1650 mAh/g.

TABLE 1

| | Example 1 | | Comparative Example 1 | |
|---|---|---|---|---|
| Content of positive electrode active material | Specific capacity (mAh/g) | Specific capacity (mAh/g)/ theoretical specific capacity (mAh/g) | Specific capacity (mAh/g) | Specific capacity (mAh/g)/ theoretical specific capacity (mAh/g) |
| 1 (mg/cm²) | 1367 | 1.08 | 1650 | 1.00 |
| 4 (mg/cm²) | 979 | 0.77 | 666 | 0.40 |
| 5 (mg/cm²) | 825 | 0.65 | 530 | 0.32 |

As given in Table 1, the test cell according to Example 1 exhibited a higher ratio of specific capacity than the theoretical specific capacity in comparison with the test cell according to Comparative Example 1 when the content of the positive electrode active material was the same. In particular, this tendency was clearer when the content of the positive electrode active material was relatively large.

Further, when the content of the positive electrode is 4 mg/cm² or 5 mg/cm², the specific capacity measured for Example 1 was greater than that measured for Comparative Example 1. By using iron disulfide, the theoretical specific capacity for Example 1 was decreased as compared with the theoretical specific capacity for Comparative Example 1. Therefore, from the above result, it is found that the increase in the specific capacity due to the ion conductivity and electron conductivity caused by iron disulfide is larger than the decrease in the theoretical specific capacity.

Further, when the content of the positive electrode active material in the test cell according to Example 1 was 1 mg/cm², the measured specific capacity was larger than the theoretical specific capacity. This suggests that the specific capacity increases as a result of the halogen-containing sulfide solid electrolyte acting as the positive electrode active material.

Further, the test cell according to Example 1 and the cell according to Comparative Example 2 were subjected to electrochemical evaluation as follows. Specifically, the charging and discharging characteristics of each of the test cells were evaluated at 25° C. under an argon atmosphere while applying pressure at a torque of 3 Nm. In this case, an electric current of 0.05 C was applied to the positive electrode active material of 1 mg/cm² at a cut-off potential of 1.3V-3.1V (vs. Li/Li+). Further, the specific capacity of the charge-discharge curve after 20 cycles was measured. The obtained specific capacities are given in Table 2 below. The theoretical specific capacity of the test cell according to Example 1 is 1265 mAh/g, and the theoretical specific capacity of the test cell according to Comparative Example 2 is 960 mAh/g. A C rate (means a current which will discharge a battery in one hour, e.g., a C rate for a battery having a discharge capacity of 1.6 ampere-hours would be 1.6 amperes.

TABLE 2

| Example 1 | | Comparative Example 2 | |
|---|---|---|---|
| Specific capacity (mAh/g) | Specific capacity (mAh/g)/theoretical specific capacity (mAh/g) | Specific capacity (mAh/g) | Specific capacity (mAh/g)/theoretical specific capacity (mAh/g) |
| 1181 | 0.93 | 786 | 0.82 |

As given in Table 2, the test cell according to Example 1 exhibited improved charge-discharge capacity (specific capacity), in particular, an improved ratio of specific capacity to the theoretical specific capacity as compared with the test cell according to Comparative Example 2.

Figure 2:
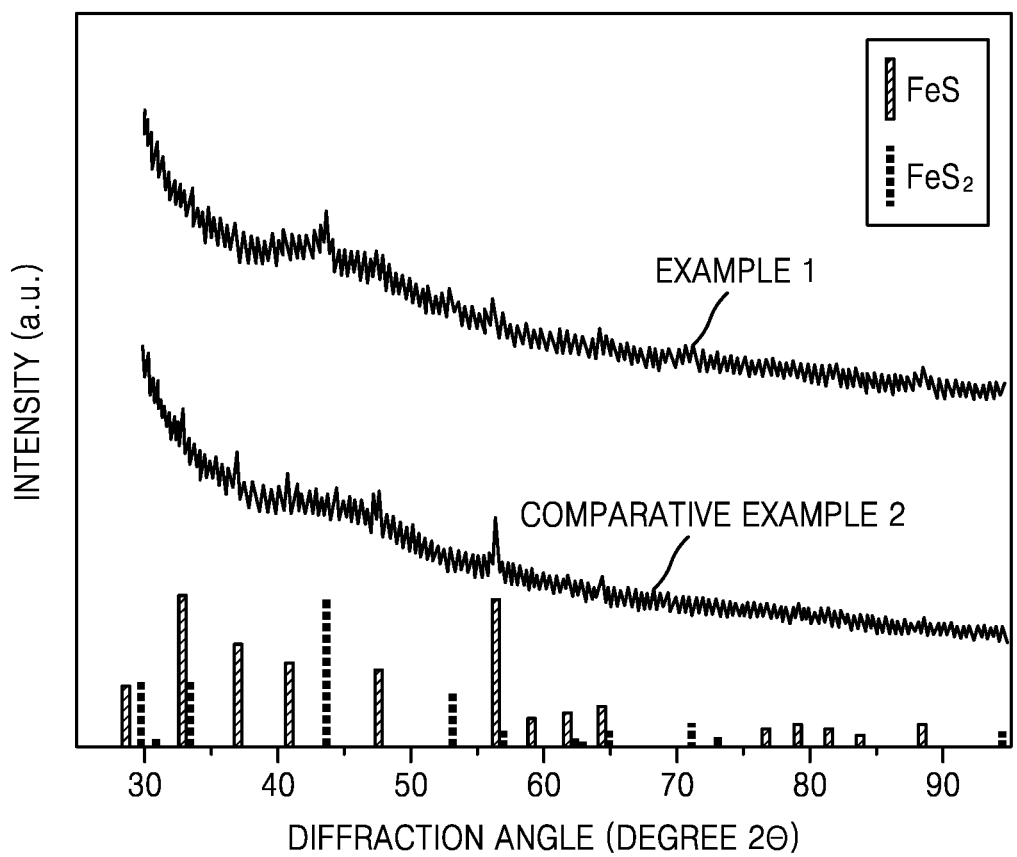
FIG. 2 is a graph of intensity (arbitrary units, a.u.) versus diffraction angle (degrees 2 θ) for a positive electrode mixture after the charge-discharge tests of all-solid-state secondary batteries according to Example 1 and Comparative Example 2.

Further, the composition of the positive electrode mixture after the initial charging and discharging was analyzed by X-ray diffraction. The X-ray diffraction test results are shown in FIG. 2. In the graph of FIG. 2, the lower part shows the peak position and specific intensity disclosed by ICDD (International Center for Diffraction Data), respectively. Iron disulfide ($FeS_2$) indicates a bar based on ICDD PDF 01-071-0053, and iron sulfide (FeS) indicates a bar based on ICDD PDF 01-075-2377.

Referring to FIG. 2, it was observed that, in the positive electrode mixture of the test cell according to Comparative Example 2, the crystal structure of iron disulfide ($FeS_2$) is changed by iron sulfide (FeS). This is presumed because the conductive carbon material (activated carbon) in the positive electrode mixture adsorbed sulfur atoms during charging and discharging. Meanwhile, it was observed that, in the positive electrode mixture of the test cell according to Example 1, the crystal structure of iron disulfide ($FeS_2$) is maintained. This is presumed that the elemental sulfur in the positive electrode mixture of the test cell according to Example 1 is preferentially adsorbed in the conductive carbon material, and thus the crystal structure of iron disulfide ($FeS_2$) is maintained.

As a result, it is found that when the crystal structure of iron disulfide ($FeS_2$) in the positive electrode active material is maintained, the effect of improving ion conductivity and electron conductivity is greater and specific capacity is increased, compared to when the crystal structure thereof is not maintained.

As described above, according to the all-solid-state secondary battery of the present disclosure, it is possible to increase the specific capacity of the all-solid-state secondary battery even when a relatively large amount of the positive electrode active material is loaded.

It should be understood that embodiments described herein should be considered in a descriptive sense only and not for purposes of limitation. Descriptions of features or aspects within each embodiment should be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

For example, in the above embodiment, examples in which the positive electrode layer 10, the negative electrode layer 20, and the solid electrolyte layer 30 include a halogen-containing sulfide solid electrolyte are shown, but the present disclosure is not limited to these examples. For example, the positive electrode layer 10, the negative electrode layer 20, and the solid electrolyte layer 30 may not include a halogen-containing sulfide solid electrolyte, and may include a known solid electrolyte.

What is claimed is:

1. An all-solid-state secondary battery, comprising:
    a positive electrode layer;
    a negative electrode layer; and
    a solid electrolyte layer between the positive electrode layer and the negative electrode layer,
    wherein the positive electrode layer comprises a sulfur-containing positive electrode active material, a halogen-containing sulfide solid electrolyte, and a conductive carbon material, and
    wherein the sulfur-containing positive electrode active material comprises elemental sulfur and a transition metal disulfide and a weight ratio of the transition metal disulfide to the elemental sulfur is greater than 0 and less than 8.

2. The all-solid-state secondary battery of claim 1, wherein the transition metal disulfide comprises iron disulfide.

3. The all-solid-state secondary battery of claim 1, wherein the weight ratio of the transition metal disulfide to the elemental sulfur is greater than or equal to 0.5 and less than or equal to 2.

4. The all-solid-state secondary battery of claim 1, wherein a content of the sulfur-containing positive electrode active material in the positive electrode layer is about 0.5 milligrams per square centimeter or more.

5. The all-solid-state secondary battery of claim 1, wherein a content of the sulfur-containing positive electrode active material in the positive electrode layer is about 10 milligrams per square centimeter or less.

6. The all-solid-state secondary battery of claim 1, wherein a content of the sulfur-containing positive electrode active material in the positive electrode layer is about 5 weight percent to about 70 weight percent, based on a total weight of the positive electrode layer.

7. The all-solid-state secondary battery of claim 1, wherein a surface area of the conductive carbon material is about 1000 square meters per gram or more.

8. The all-solid-state secondary battery of claim 1, wherein a surface area of the conductive carbon material is about 6000 square meters per gram or less.

9. The all-solid-state secondary battery of claim 1, wherein the conductive carbon material comprises active carbon.

10. The all-solid-state secondary battery of claim 1, wherein the halogen-containing sulfide solid electrolyte comprises a halide, and wherein the halide is of the formula LiX, wherein X is Cl, Br, I, or combination thereof.

11. The all-solid-state secondary battery of claim 1, wherein a composition of the halogen-containing sulfide solid electrolyte is of the formula aLiX·(100-a)(0.75Li$_2$S-0.25P$_2$S$_5$), wherein 0<a<50 and X is Cl, Br, I, or a combination thereof.

12. The all-solid-state secondary battery of claim 1, wherein a composition of the halogen-containing sulfide solid electrolyte is of the formula 35LiI·65 (0.75Li$_2$S.0.25P$_2$S$_5$).

13. The all-solid-state secondary battery of claim 1, wherein the positive electrode layer further comprises a sulfide solid electrolyte other than the halogen-containing sulfide solid electrolyte.

14. The all-solid-state secondary battery of claim 13, wherein the sulfide solid electrolyte comprises Li$_2$S—P$_2$S$_5$, Li$_2$S—P$_2$S$_5$—LiX wherein X is a halogen element, Li$_2$S—P$_2$S$_5$—Li$_2$O, Li$_2$S—SiS$_2$, Li$_2$S—SiS$_2$—B$_2$S$_3$, Li$_2$S—B$_2$S$_3$, Li$_2$S—P$_2$S$_5$—Z$_m$S$_n$ wherein m and n are each independently a positive integer and Z is Ge, Zn, Ga, or a combination thereof, Li$_2$S—GeS$_2$, Li$_2$S—SiS$_2$—Li$_3$PO$_4$, Li$_2$S—SiS$_2$—Li$_p$MO$_q$ wherein p and q are each independently a positive integer, and M is P, Si, Ge, B, Al, Ga, In, or a combination thereof, or a combination comprising at least one of the foregoing.

15. The all-solid-state secondary battery of claim 13, wherein the sulfide solid electrolyte comprises Li$_3$PS$_4$.

16. The all-solid-state secondary battery of claim 13, wherein the sulfide solid electrolyte comprises Li$_2$S—P$_2$S$_5$.

17. The all-solid-state secondary battery of claim 16, wherein a molar ratio of Li$_2$S to P$_2$S$_5$ in the Li$_2$S—P$_2$S$_5$ is 50:50 to 90:10.

18. The all-solid-state secondary battery of claim 16, wherein a composition of the sulfide solid electrolyte is 0.75Li$_2$S.0.25P$_2$S$_5$.

19. The all-solid-state secondary battery of claim 1, wherein the negative electrode layer is a lithium metal layer.

20. The all-solid-state secondary battery of claim 1, wherein the weight ratio of the transition metal disulfide to the elemental sulfur is greater than or equal to 0.2 and less than or equal to 3.

* * * * *